Patented Jan. 31, 1928.

1,658,003

UNITED STATES PATENT OFFICE.

BERTRAM MAYER AND HUGO SIEBENBÜRGER, OF BASEL, SWITZERLAND, ASSIGNORS TO THE FIRM: SOCIETY OF CHEMICAL INDUSTRY IN BASLE, OF BASEL, SWITZERLAND.

VAT DYESTUFFS BY DEHALOGENATING POLYHALOGEN-VIOLANTHRONES.

No Drawing. Application filed June 28, 1926, Serial No. 119,232, and in Switzerland December 24, 1925.

This invention relates to new vat dyestuffs, valuable for the production of fast tints on the fibre, the process of making same, and the material dyed with the new dyestuffs.

The vat dyestuffs of the violanthrone family, as for instance violanthrone and isoviolanthrone (cf. Schultz, Farbstofftabellen, 6th edition, No. 763 and 766, French Patent No. 407,593, and Annalen der Chemie, vol. 394, pages 128 and 146-147) dye cotton, as is well known, very fast violet and dark blue shades of little brilliancy. Dyestuffs dyeing in much more brilliant shades are obtained by converting these compounds into their polyhalogen substitution products, which conversion is accompanied by a considerable change of shade. Isoviolanthrone for instance dyes cotton violet, whereas dichloroisoviolanthrone yields on this fibre a bright red-violet shade (cf. Schultz l. c. No. 767).

It has been found that by treating the leuco compounds of polyhalogen substitution products of the dyestuffs of the violanthrone and isoviolanthrone series with alkaline reducing agents, these leuco compounds, by simultaneously splitting off part of their halogen, are converted into new leuco derivatives. The leuco compounds thus obtained may be converted by oxidation either on the fibre or in substance, into new dyestuffs which, generally speaking, have at the same time the shade of the unhalogenated dyestuff and the brightness of its polyhalogen substitution product.

The new process may be carried out either by heating the vats of the named dyestuffs, which contain nearly always an excess of hydrosulfite and caustic alkali, at higher temperatures than indicated in the corresponding literature, or preparing the vats from the very beginning at higher temperatures and with an excess of hydrosulfite and caustic alkali, or treating the corresponding dyestuffs with strong reducing agents, such as zinc dust and a caustic alkali.

The new dyestuffs may be separated from the alkaline solutions of their dihydro compounds by oxidation (for instance blowing air through). The reaction mixture may of course also be employed directly as dyebath, if desired after appropriate dilution, and thus the same shades may be obtained on the fibre as with the new dyestuffs which have been previously separated. They form violet powders, dissolving in concentrated sulfuric acid with red-violet to green coloration, and yielding with hydrosulfite and caustic soda solution blue vats, dyeing cotton violet shades similar to those of the unhalogenated dyestuffs, but very much more brilliant.

Example 1.

10 parts of dichloroisoviolanthrone are suspended in 50 parts of caustic soda solution of 30% strength and 470 parts of water. The whole is heated to 60° C., treated with 30 parts of hydrosulfite, and kept for 1 hour at 60-65° C., while stirring carefully. The deep blue vat is filtered and the residue is washed with alkaline water containing hydrosulfite. From the filtrates the new dyestuff is precipitated by blowing air through.

According to the analysis the new dyestuff contains one chlorine atom less than the parent material corresponding thus very probably to the formula:

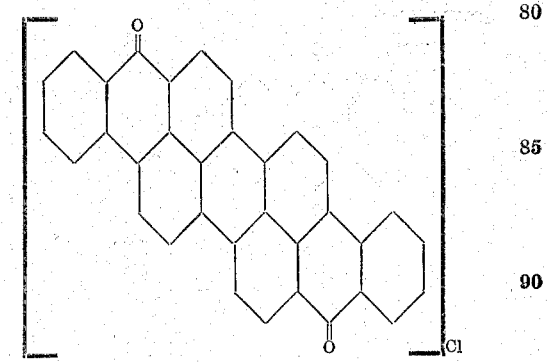

It dissolves in concentrated sulfuric acid with deep pure green coloration. Pouring the solution into water pure violet flakes separate. The dyestuff dissolves in boiling xylene with red coloration and orange-red fluorescence and dyes cotton in very pure blue-violet shades, which combine the great purity of the red-violet dichloroisoviolanthrone with the blue shade of the duller unchlorinated isoviolanthrone.

By treatment of dichloroisoviolanthrone with zinc dust and caustic soda solution the same dyestuff is obtained.

The dichloroviolanthrone (cf. Schultz Farbstofftabellen, 6th edition No. 764) yields a product that dyes cotton bluish-violet tints slightly redder than the parent material.

If violanthrone is chlorinated with chlorine gas at 135–140° C. there is obtained a halogenated dyestuff dyeing cotton from the ordinary vat navy blue shades. Vatting the dyestuff according to the above indications, a product is obtained dyeing cotton from a blue vat violet shades. The dyestuff dissolves in concentrated sulfuric acid with red-violet coloration; poured into water the solution eliminates violet flakes. In boiling xylene or nitrobenzene the product dissolves with blue-violet coloration and brownish-red fluorescence.

*Example 2.*

10 parts of dichloroisoviolanthrone are suspended in 40 parts of caustic soda solution of 30% strength and 970 parts of water. The suspension is heated to 60° C. and treated with 30 parts of hydrosulfite, the mixture being kept for 1 hour, while stirring, at 60–65° C. The vat obtained is then poured into 8000 parts of water of 60° C., containing 133 parts of caustic soda solution of 30% strength. 500 parts of cotton are introduced into this vat at 60° C. and dyed as usual for 3/4 of an hour. The material is then rinsed, oxidized, soured and boiled with soap solution. There is obtained a pure blue-violet shade identical with that of the dyestuff described in paragraph 1 of the preceding example. The formula of this dyestuff thus also very probably corresponds to the following:—

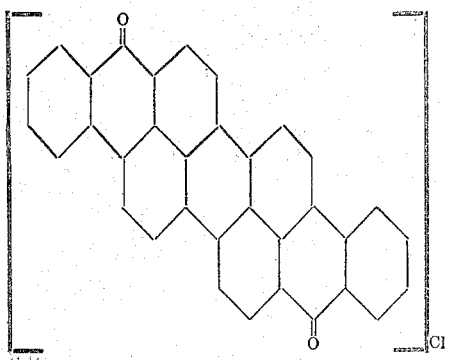

What we claim is:

1. The herein described new process for the manufacture of new halogenated vat dyestuffs, which consists in eliminating from the leuco derivatives of polyhalogen substitution products of the dyestuffs of the violanthrone family, part of their halogen by treatment in an alkaline solution with reducing agents, and then oxidizing the leuco compounds thus obtained.

2. The herein described new process for the manufacture of new halogenated vat dyestuffs, which consists in eliminating from the leuco derivatives of polyhalogen substitution products of the dyestuffs of the violanthrone family, part of their halogen by treatment in the dyebath with reducing agents, and then oxidizing the new leuco compound on the dyegoods.

3. The herein described new process for the manufacture of new halogenated vat dyestuffs, which consists in eliminating from the leuco derivatives of polyhalogen substitution products of the dyestuffs of the isoviolanthrone series part of their halogen by treatment in an alkaline solution with reducing agents and oxidizing the new leuco compounds thus obtained.

4. The herein described new process for the manufacture of new halogenated vat dyestuffs, which consists in eliminating from the leuco derivatives of polyhalogen substitution products of the dyestuffs of the isoviolanthrone series part of their halogen by treatment in the dyebath with reducing agents, and then oxidizing the new leuco compound on the dyegoods.

5. The herein described new process for the manufacture of a new chlorinated vat dyestuff, which consists in eliminating from the leuco derivative of the dichloroisoviolanthrone part of its halogen by treatment in an alkaline solution with reducing agents, and then oxidizing the leuco compound thus obtained.

6. The herein described new process for the manufacture of a new chlorinated vat dyestuff, which consists in eliminating from the leuco derivative of the dichloroisoviolanthrone part of its halogen by treatment in the dyebath with reducing agents, and then oxidizing the new leuco compound on the dyegoods.

7. As new products the herein described new halogenated vat dyestuffs, which are obtained by treating the leuco compounds of polyhalogen substitution products of the dyestuffs of the violanthrone family, with reducing agents, which compounds form violet powders, dissolving in concentrated sulfuric acid with red-violet to green coloration, yielding with hydrosulfite and caustic soda solution a blue vat which dyes cotton violet shades similar to those of the unhalogenated dyestuffs but very much more brilliant.

8. As new products the herein described new halogenated vat dyestuffs, which are obtained by treating the leuco compounds of polyhalogen substitution products of the dyestuffs of the isoviolanthrone series with reducing agents, which compounds form violet powders, dissolving in concentrated sulfuric acid with green coloration, yielding with hydrosulfite and caustic soda solution a blue vat which dyes cotton violet shades similar to those of unhalogenated isoviolanthrone but very much more brilliant.

9. As new product the herein described new chlorinated vat dyestuff, which is obtained by treating the leuco compound of dichloroisoviolanthrone with reducing agents, which compound forms a violet powder, dissolving in concentrated sulfuric acid with green coloration, yielding with hydrosulfite and caustic soda solution a blue vat which dyes cotton violet shades similar to those of unhalogenated isoviolanthrone but very much more brilliant.

10. Material dyed with the dyestuffs of claim 7.

11. Material dyed with the dyestuffs of claim 8.

12. Material dyed with the dyestuffs of claim 9.

In witness whereof we have hereunto signed our names this 15th day of June, 1926.

BERTRAM MAYER.
HUGO SIEBENBÜRGER.